United States Patent
Friedrich

[15] 3,696,230
[45] Oct. 3, 1972

[54] LASER LENS COOLING AND CLEANING SYSTEM

[72] Inventor: Howard R. Friedrich, Woodland Hills, Calif.

[73] Assignee: Hughes Aircraft Company, Culver City, Calif.

[22] Filed: Jan. 19, 1970

[21] Appl. No.: 3,627

[52] U.S. Cl. .............................. 219/121 L, 350/63
[51] Int. Cl. ........................................... B23k 27/00
[58] Field of Search........ 219/121 L; 350/63; 240/47, 240/151

[56] References Cited

UNITED STATES PATENTS

| | | | |
|---|---|---|---|
| 3,597,578 | 8/1971 | Sullivan et al. | 219/121 L |
| 3,569,660 | 3/1971 | Houldcroft | 219/121 LM |
| 3,321,265 | 5/1967 | Clave et al. | 350/63 |
| 2,959,090 | 11/1960 | Davies | 350/63 |
| 3,310,356 | 3/1967 | Borberg | 350/63 |

*Primary Examiner*—J. V. Truhe
*Assistant Examiner*—George A. Montanye
*Attorney*—James K. Haskell and Joseph P. Kates

[57] ABSTRACT

The beam from a laser is focused, by means of a lens, onto a material which is to be burned thereby. The lens is supported in a housing which, among other functions, operates as a heat sink for the lens. Further, the housing is shaped so that a gas which is applied, from a source under pressure, to the housing, cools the housing, flows over the lens surfaces, and thereafter is directed at the location where the burning occurs to insure that none of the products resulting therefrom can reach the surface of the lens, and also to either assist the burning operation of the laser beam, or to confine it. Since the gas which is introduced into the housing is at a pressure greater than atmosphere it prevents its entrance into the housing of any particles that may dirty the laser lens or a mirror which is disposed in the housing to reflect the lens beam towards the material.

4 Claims, 5 Drawing Figures

INVENTOR.
HOWARD R. FRIEDRICH,
BY
Joseph P. Kater
ATTORNEY.

3,696,230

LASER LENS COOLING AND CLEANING SYSTEM

BACKGROUND OF THE INVENTION

This invention relates to lens systems for focusing laser beams, and more particularly to improvements therein.

The usual technique for employing high power laser outputs to perform a cutting or burning operation is to focus the laser beam by means of a lens at the workpiece. In view of the heating power of the laser beam, the lens, if suitable precautions are not taken, will absorb some of the energy of the beam with the result that it will rapidly heat up and crack. To prevent this the lens is usually air cooled using a heavy finned heat sink structure. Also, the products of the combustion of the material which is being burned rises and, if suitable precautions are not taken, these combustion products may deposit on the lens thereby absorbing heat from the beam to cause the temperature of the lens to rise as well as reducing the power of the beam available for burning. Finally, dust and dirt in the atmosphere deposit on the lens and/or the mirrors which are used to direct the laser beam through the lens, serving as a potential source for increasing the temperature of these structures, as well as causing a loss in the efficiency of transmission of the light beam.

It is known, in order to assist the laser beam burning operation, to direct a stream of oxygen at the region that the laser beam strikes the material being burned. Also if the material is inflammable, a stream of an inert gas, such as nitrogen is directed at the region of the material being burned by the laser beam to prevent combustion. To do this, a chamber, having a window at one end and a nozzle opening at the other end is placed in the path of the laser beam. The gas required is pumped into the chamber and escapes through the nozzle opening. The laser beam passes through the window and nozzle opening. The chamber window in the path of the laser beam is additional structure which must be maintained cool and contamination free. It serves to absorb some of the power of the laser beam.

OBJECTS AND SUMMARY OF THE INVENTION

It is an object of this invention to provide a structure whereby the adverse effects of heat, combustion products and dust are eliminated in a laser lens system.

It is another object of the present invention to provide a unique heat sink construction for a laser lens which is lighter and smaller than those used heretofore.

Still another object of the present invention is the provision of a novel, useful and efficient arrangement for maintaining the temperature of the laser lens within safe limits and also for treating with a gas the region of a laser beam which impinges upon said material.

These and other objects of the invention are achieved by providing a heat sink into which the laser lens fits. The heat sink has one portion which is positioned behind the laser lens which has cooling vanes shaped in the form of a spiral which forms a spiral tunnel into the walls of the heat sink. A gas directed at the spiral tunnel acts as a coolant and is conducted around the metal of the heat sink extracting the heat therefrom. The end of the spiral tunnel structure leads into a tube which extends from the front surface of the lens structure toward the workpiece. The end of the tube which is opposite the location of the workpiece is open. The coolant gas passing from the end of the spiral tunnel is directed over the back and front surfaces of the lens serving to maintain the lens clean. A portion of this gas then passes down through the tube and is directed thereby at the region of the workpiece which is being burned by the laser beam. Since the gas is emitted from the tube at a positive pressure, combustion products from the workpiece will not ascend the tube to be deposited on the lens.

The gas flowing over the backside of the lens is also at a higher than atmosphere pressure. It flows over the backside of the lens and flows backwards towards a mirror which directs the light from the end of the laser onto the focusing lens. Both lens and mirror are maintained dust free by virtue of the fact that the gas is under positive pressure which thereafter escapes into the atmosphere, thus preventing any dust from entering the housing.

BRIEF DESCRIPTION OF THE DRAWINGS

Referring now to FIG. 1, the manner in which cutting is presently done, employing presently known $CO_2$ laser systems, is shown in FIG. 1. The $CO_2$ laser 10 generates a light beam, represented by the dotted lines, which is directed at a plane mirror 12. The plane mirror directs the light beam upon a focusing lens 14. The focusing lens focuses the light beam upon the workpiece to be burned 16. A chamber 15 is placed in the light beam path and includes walls 18 forming 9 nozzle shaped cavity wherein the walls support a plane transparent window 20 at one side, opposite which there is the nozzle opening 22.

Gas under pressure from a source 24, is fed into the chamber. For some applications a reactive gas, such as oxygen, is employed to assist in metal cutting. An inert gas, such as nitrogen, is employed where inflammable or brittle materials are used. Note that the mirror 12 and the lens 14 may be enclosed in a housing 15.

Figure 1:
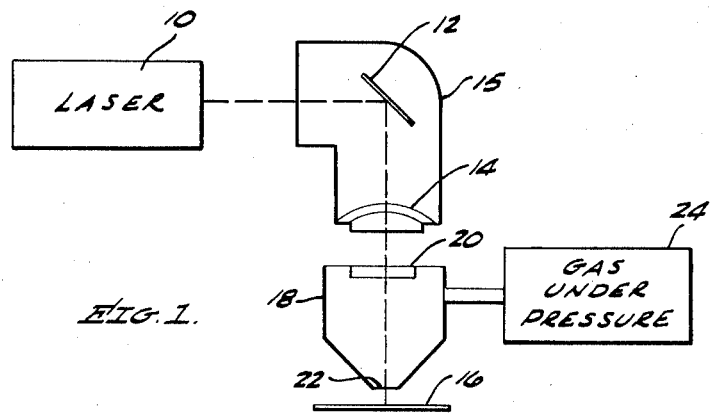
FIG. 1 is a schematic representation of prior art cutting systems shown to assist in an understanding and appreciation of this invention.

The arrangement shown in FIG. 1, while admittedly schematic, cannot be continuously used without carefully cleaning the lens 14, the window 20, and the mirror 12. Dust in the atmosphere, as well as products of the combustion of the material 16, if not completely removed, does manage to get back into the housing 15 to contaminate the mirror 12, the lens 14 and the window 20. Great care must be taken to maintain these clean since, because of the power of the beam of the laser, any dirt accumulation causes these delicate parts of the system to heat up and crack.

Another problem is that while the lens 14 transmits most of the light passing therethrough, it does not transmit all of it. A portion of the energy in the light that is not transmitted is absorbed and causes the lens to heat up. Thus, it cannot be used continuously for burning otherwise it overheats and cracks.

Figure 2:
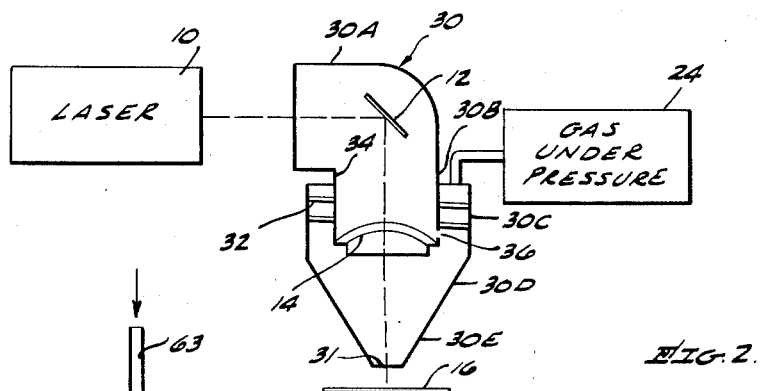
FIG. 2 is a schematic representation of a first illustrative embodiment of the invention.

FIG. 2 illustrates schematically the embodiment of the invention. The $CO_2$ laser 10 provides a light beam, again represented by a dotted line. The plane mirror 12 and the lens 14 are supported within a housing 30, which is a different structure than that used in the prior art. The housing 30 includes a first section 30A which effectively comprises tubing for enclosing a mirror 12. The tubing terminates in a bellows section 30B which couples it adjustably to a heat sink section 30C. The lens 14 is supported from the heat sink section 30C and is prevented from overheating thereby. The heat sink section is coupled through a transition section 30D to a cone section 30E. There is an opening 31 in the cone section adjacent the workpiece 16. This opening is concentric with the beam which is focused on the workpiece by the lens 14.

Gas (either reactive or inert) from a source 24, which is under pressure, is applied to one side of the heat sink section 30C. The heat sink section includes vanes 32, which are arranged in a spiral between an inner wall 34 and an outer wall (not numbered) of the heat sink forming a spiral tunnel. Thus, gas under pressure from the source 24 will circulate between the walls of the heat sink section 34 under the direction of the vanes 32. The gas extracts heat while flowing through the heat sink section 30C. Thereafter, the gas under pressure will fill the cone section 30E, flowing over the lower surface of the lens 14 and thereafter out through the opening 31 in the cone section 30E of the housing 30. The gas that flows out through the opening, impinges on the region of the workpiece being burned by the laser beam, and blows away the combustion products. These cannot get back at the lens through the housing opening 31. Suitable ventilating means, not shown, remove these combustion products.

An opening 36 in the wall of the heat sink section 34 enables some of the gas under pressure to flow over the backside of the lens 14, and thereafter, over the surface of the plane mirror 12 and out through the opening in the housing 30 adjacent the entrance port for the laser beam. In this way, the backside of the lens and the plane mirror are kept clean and free of unwanted contamination which otherwise would drift in through the housing opening.

From the foregoing description it will be seen that the gas which is employed to either assist the burning operation of the laser 10 or to prevent burning from occurring other than within the focused laser beam, is also employed to keep the lens 14 and reflecting mirror 12 clean, and further to maintain the lens temperature at a level whereby truly continuous operation of the laser system is made possible. Also, the additional intermediate structure for supplying gas to the burning area is eliminated without eliminating its function.

Figure 3:
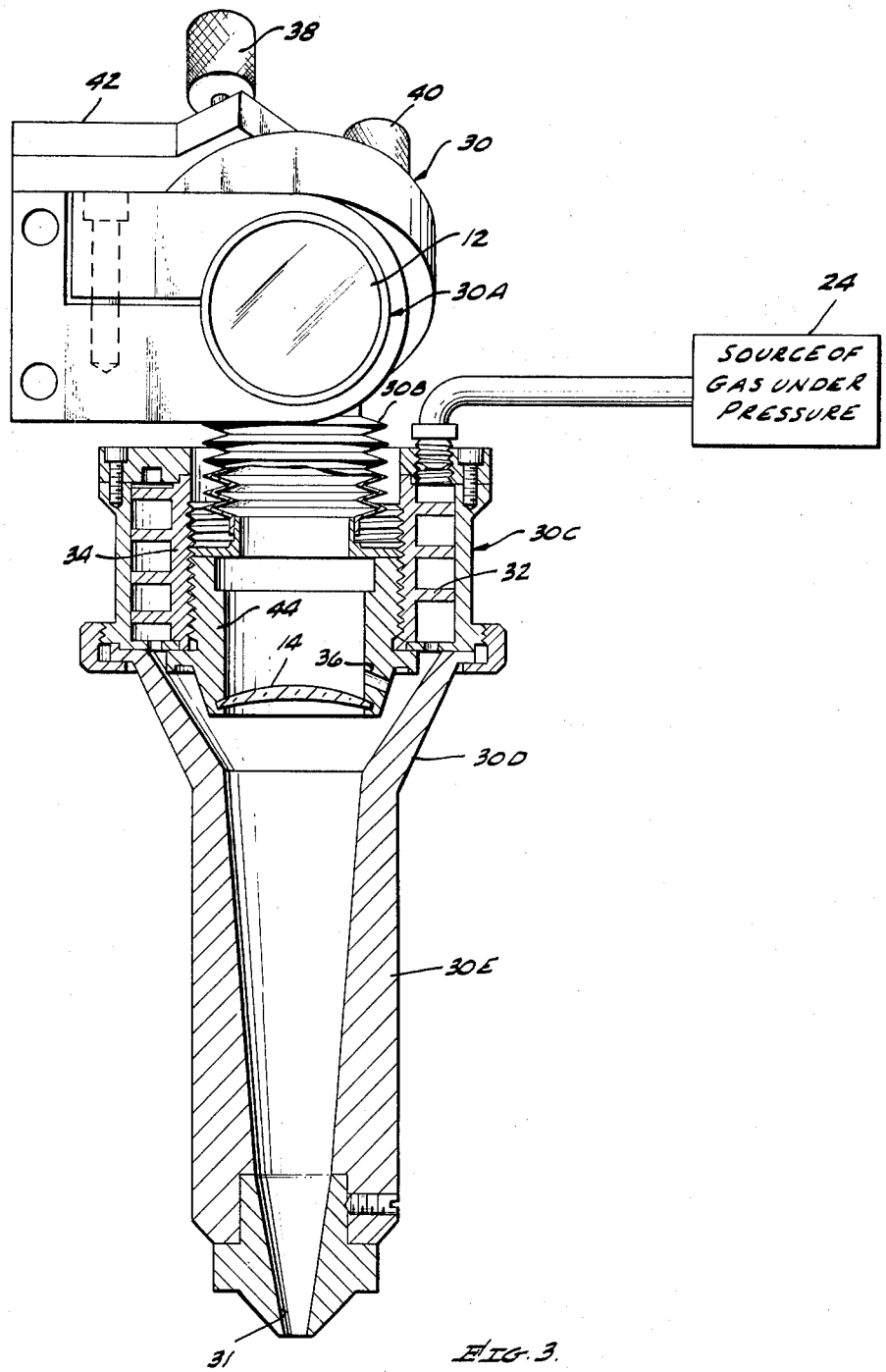
FIG. 3 is a cross-sectional view of the illustrative embodiment of FIG. 2 of the invention.

FIG. 3 is a cross sectional view of an actual embodiment of the invention. The view is taken from the direction of the entrance of the laser light beam into the housing 30. Structure which has the identical function as that shown in FIG. 2 is given the same reference numerals. The plane mirror 12 has its position adjusted in order to direct the light beam which it receives through the center of the lens 14, by turning the knurled knobs 38, 40. These extend through a bracket 42 which is used to support the arrangement. The bellows 30B is used to afford distance adjustment between the mirror 12 and the lens 14.

The lens 14 is a commercially sold item. It is normally held within a substantially tubular lens holder 44. The walls of the lens holder 44 are threaded into the heat sink walls 34 to insure an intimate heat transferring relationship. The opening 36 is drilled in the lens holder fixture walls.

Figure 4:
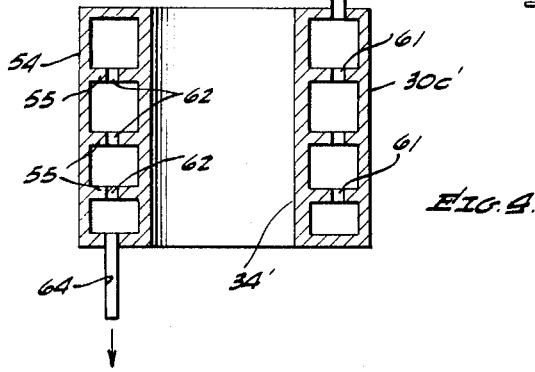
FIG. 4 is a cross-sectional view of a second illustrative embodiment heat sink section employable with the remainder of the system of FIGS. 2 and 3.

Refer to FIG. 4. In this embodiment a heat sink section 30C' is provided which may alternatively be threadedly engaged with the lens support section 34 (with adhesive substance of characteristics to facilitate heat transfer from the lens holder 44 to the heat sink section 30C'). Heat sink section 30C' comprises an inner wall 34', an outer wall 54, and a plurality of spaced flange shaped partitions 55 which join the inner wall 54 to the outer wall 55 at spaced intervals. An inlet 63 from the source of gas under pressure 24 (as in FIG. 3) and an outlet 64 near the lens 14 (such as in the FIG. 3 embodiment) are provided. Aligned with the inlet 63 are a first plurality of apertures 61, an aperture 61 being formed in each of the partitions 55 except the bottom enclosing one. Aligned with the outlet 64 are a second plurality of apertures 62, apertures 62 being formed in each of the partitions 55 except the upper enclosing one. The direction of gas flow in heat sink 30C' is indicated by the arrows.

Figure 5:
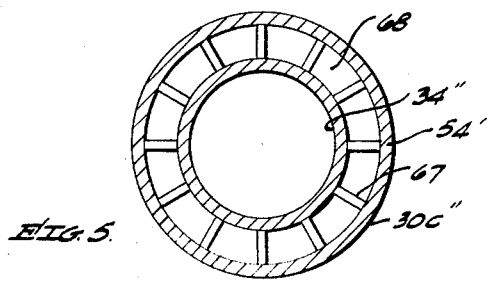
FIG. 5 is a plan view of a third illustrative embodiment heat sink section employable with the remainder of the system of FIGS. 2 and 3.

Refer to FIG. 5. This embodiment heat sink section 30C'' comprises an inner wall 34'', an outer wall 54' and a plurality of vertically partitioning fins 67 between which are vertical passageways 68 for gas flow from top to bottom.

There has accordingly been shown and described herein a novel and unique arrangement whereby continuous operation of a laser burning system is enabled by maintaining the focusing lens temperature at a safe level, by keeping the lens and mirror used in said system clean.

What is claimed is:

1. In a system wherein the light beam from a laser is focused by a lens at a workpiece, and gas under pressure from a source is directed at said workpiece, the improvement comprising:

a housing having an inlet and an outlet;
a double-walled barrel-shaped heat sink attached to said housing, said heat sink communicating at its rear end with said housing through said outlet and having means forming a cooling passageway within its walls, said passageway having an inlet and an outlet,
gas directing means extending from said heat sink outlet to said workpiece,
means for directing gas from said source to said heat sink inlet,
means for supporting said lens in thermal contact with said heat sink, with at least one face of said lens being in the path of the gas exiting from said heat sink outlet, whereby said gas flows through said heat sink extracting heat therefrom, then flows over said one face of said lens, and thereafter is directed by said gas directing means at said workpiece, and means for causing said gas to flow over the opposite face of said lens, said lens substantially sealing the front end of said heat sink so as to cause said gas to then flow backward through said heat sink, and out through said housing inlet.

2. Apparatus as recited in claim 1 wherein a plane mirror is positioned to direct a laser light beam at the center of said laser lens, said housing includes a housing section for enclosing said plane mirror, and bellows means joining said housing section to said heat sink whereby gas passes from said opposite surface of said laser lens to the surface of said plane mirror and thereafter out of said housing section.

3. The system recited in claim 1 characterized further in that said means forming a cooling passageway through said heat sink comprises:
   a cylindrical inner wall and concentrically spaced therefrom a cylindrical outer wall, and a helical vane extending between said inner and outer walls to define a helical passageway for said gas.

4. A system as recited in claim 3 which includes a mirror for directing said light beam from said laser at said laser lens, and
   means supporting said mirror within said housing and in the path of said gas as it passes backward through said heat sink, whereby said mirror surface is maintained clean.

* * * * *